US009110795B2

(12) United States Patent
Stewart et al.

(10) Patent No.: US 9,110,795 B2
(45) Date of Patent: Aug. 18, 2015

(54) SYSTEM AND METHOD FOR DYNAMICALLY ALLOCATING MEMORY IN A MEMORY SUBSYSTEM HAVING ASYMMETRIC MEMORY COMPONENTS

(71) Applicant: QUALCOMM Incorporated, San Diego, CA (US)

(72) Inventors: Richard A. Stewart, San Diego, CA (US); Dexter T. Chun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/781,320

(22) Filed: Feb. 28, 2013

(65) Prior Publication Data
US 2014/0164720 A1 Jun. 12, 2014

Related U.S. Application Data

(63) Continuation of application No. 13/726,537, filed on Dec. 24, 2012, now Pat. No. 8,959,298.

(60) Provisional application No. 61/735,352, filed on Dec. 10, 2012.

(51) Int. Cl.
G06F 12/00 (2006.01)
G06F 12/06 (2006.01)
G06F 13/16 (2006.01)

(52) U.S. Cl.
CPC ........ *G06F 12/0607* (2013.01); *G06F 13/1647* (2013.01)

(58) Field of Classification Search
CPC ........................... G06F 12/607; G06F 13/1647
See application file for complete search history.

(56) References Cited

U.S. PATENT DOCUMENTS 7,620,793 B1 11/2009 Edmondson et al.
7,768,518 B2 8/2010 Collins et al.
8,194,085 B2 6/2012 Greco et al.
(Continued)

FOREIGN PATENT DOCUMENTS

EP 1591897 A2 11/2005
TW 201205305 A 2/2012
WO WO-9004576 A2 5/1990

OTHER PUBLICATIONS

Li J., et al., "An Optimized Large-Scale Hybrid DGEMM Design for CPUs and ATI GPUs," ICS '2012 Proceedings of the 26th ACM international conference on Supercomputing, pp. 377-386.
(Continued)

*Primary Examiner* — Cheng-Yuan Tseng
*Assistant Examiner* — Alan Otto
(74) *Attorney, Agent, or Firm* — Nicholas A. Cole

(57) ABSTRACT

Systems and methods are provided for dynamically allocating a memory subsystem. An exemplary embodiment comprises a method for dynamically allocating a memory subsystem in a portable computing device. The method involves fully interleaving a first portion of a memory subsystem having memory components with asymmetric memory capacities. A second remaining portion of the memory subsystem is partial interleaved according to an interleave bandwidth ratio. The first portion of the memory subsystem is allocated to one or more high-performance memory clients. The second remaining portion is allocated to one or more relatively lower-performance memory clients.

21 Claims, 12 Drawing Sheets

(56) References Cited

U.S. PATENT DOCUMENTS

| | | | |
|---|---|---|---|
| 8,289,333 B2 | 10/2012 | Schreyer et al. | |
| 8,314,807 B2 | 11/2012 | Biswas et al. | |
| 8,959,298 B2 | 2/2015 | Chun et al. | |
| 2004/0260864 A1 | 12/2004 | Lee et al. | |
| 2005/0235124 A1 | 10/2005 | Pomaranski et al. | |
| 2007/0180203 A1 | 8/2007 | Ramgarajan et al. | |
| 2008/0016308 A1 | 1/2008 | Bartley et al. | |
| 2008/0250212 A1 | 10/2008 | Asaro et al. | |
| 2009/0150710 A1 | 6/2009 | Bilger et al. | |
| 2009/0228631 A1 | 9/2009 | Marulkar et al. | |
| 2010/0118041 A1 | 5/2010 | Chen et al. | |
| 2010/0228923 A1* | 9/2010 | Lim | 711/147 |
| 2010/0321397 A1 | 12/2010 | Ginzburg | |
| 2011/0154104 A1 | 6/2011 | Swanson et al. | |
| 2011/0157195 A1 | 6/2011 | Sprangle et al. | |
| 2011/0320751 A1 | 12/2011 | Wang et al. | |
| 2012/0054455 A1 | 3/2012 | Wang et al. | |
| 2012/0155160 A1 | 6/2012 | Alam et al. | |
| 2012/0162237 A1 | 6/2012 | Chung | |
| 2012/0331226 A1 | 12/2012 | Krishnan et al. | |
| 2014/0101379 A1 | 4/2014 | Tomlin | |
| 2014/0164689 A1 | 6/2014 | Chun et al. | |
| 2014/0164690 A1 | 6/2014 | De et al. | |

OTHER PUBLICATIONS

Texas Instruments, "DaVinci Digital Video Processor—datasheet", Texas Instruments, SPRS614D Mar. 2011. Revised Jan. 2013, 327pgs.

International Search Report and Written Opinion—PCT/US2013/068226—ISA/EPO—Feb. 13, 2014.

* cited by examiner

| ADDRESS BLOCK | INTERLEAVE BANDWIDTH RATIO | | |
| --- | --- | --- | --- |
| | 1:1 | 2:1 | 1:2 |
| N | wideio2 | wideio2 | wideio2 |
| N + 1 | lpddr3e | wideio2 | lpddr3e |
| N + 2 | wideio2 | lpddr3e | lpddr3e |
| N + 3 | lpddr3e | wideio2 | wideio2 |
| N + 4 | wideio2 | wideio2 | lpddr3e |
| N + 5 | lpddr3e | lpddr3e | lpddr3e |
| N + 6 | wideio2 | wideio2 | wideio2 |

FIG. 5

SYSTEM AND METHOD FOR DYNAMICALLY ALLOCATING MEMORY IN A MEMORY SUBSYSTEM HAVING ASYMMETRIC MEMORY COMPONENTS

PRIORITY AND RELATED APPLICATIONS STATEMENT

This application is a continuation-in-part patent application of U.S. patent application Ser. No. 13/726,537 filed on Dec. 24, 2012, and entitled "System and Method for Managing Performance of a Computing Device Having Dissimilar Memory Types, which claims priority under 35 U.S.C. 119(e) to U.S. Provisional Patent Application filed on Dec. 10, 2012, assigned Provisional Application Ser. No. 61/735,352, and entitled "System and Method for Managing Performance of a Computing Device Having Dissimilar Memory Types," each of which are hereby incorporated by reference in their entirety.

DESCRIPTION OF THE RELATED ART

System performance and power requirements are becoming increasingly demanding in computer systems and devices, particularly in portable computing devices (PCDs), such as cellular telephones, portable digital assistants (PDAs), portable game consoles, palmtop computers, tablet computers, and other portable electronic devices. Such devices may comprise two or more types of processing units optimized for a specific purpose. For example, one or more central processing units (CPUs) may used for general system-level performance or other purposes, while a graphics processing unit (GPU) may be specifically designed for manipulating computer graphics for output to a display device. As each processor requires more performance, there is a need for faster and more specialized memory devices designed to enable the particular purpose(s) of each processor. Memory architectures are typically optimized for a specific application. CPUs may require high-density memory with an acceptable system-level performance, while GPUs may require relatively lower-density memory with a substantially higher performance than CPUs.

As a result, a single computer device, such as a PCD, may include two or more dissimilar memory devices with each specialized memory device optimized for its special purpose and paired with and dedicated to a specific processing unit. In this conventional architecture (referred to as a "discrete" architecture), each dedicated processing unit is physically coupled to a different type of memory device via a plurality of physical/control layers each with a corresponding memory channel. Each dedicated processing unit physically accesses the corresponding memory device at a different data rate optimized for its intended purpose. For example, in one exemplary configuration, a general purpose CPU may physically access a first type of dynamic random access memory (DRAM) device at an optimized data bandwidth (e.g., 17 Gb/s). A higher-performance, dedicated GPU may physically access a second type of DRAM device at a higher data bandwidth (e.g., 34 Gb/s). While the discrete architecture individually optimizes the performance of the CPU and the GPU, there are a number of significant disadvantages.

To obtain the higher performance, the GPU-dedicated memory must be sized and configured to handle all potential use cases, display resolutions, and system settings. Furthermore, the higher performance is "localized" because only the GPU is able to physically access the GPU-dedicated memory at the higher data bandwidth. While the CPU can access the GPU-dedicated memory and the GPU can access the CPU-dedicated memory, the discrete architecture provides this access via a physical interconnect bus (e.g., a Peripheral Component Interconnect Express (PCIE)) between the GPU and the CPU at a reduced data bandwidth, which is typically less than the optimized bandwidth for either type of memory device. Even if the physical interconnect bus between the GPU and the CPU did not function as a performance "bottleneck", the discrete architecture does not permit either the GPU or the CPU to take advantage of the combined total available bandwidth of the two different types of memory devices. The memory spaces of the respective memory devices are placed in separate contiguous blocks of memory addresses. In other words, the entire memory map places the first type of memory device in one contiguous block and separately places the second type of memory device in a different contiguous block. There is no hardware coordination between the memory ports of the different memory devices to support physical access residing within the same contiguous block.

Accordingly, while there is an increasing demand for more specialized memory devices in computer systems to provide increasingly more system and power performance in computer devices, there remains a need in the art for improved systems and methods for managing dissimilar memory devices.

SUMMARY OF THE DISCLOSURE

An exemplary embodiment comprises a method for dynamically allocating a memory subsystem in a portable computing device. The method involves fully interleaving a first portion of a memory subsystem having memory components with asymmetric memory capacities. A second remaining portion of the memory subsystem is partial interleaved according to an interleave bandwidth ratio. The first portion of the memory subsystem is allocated to one or more high-performance memory clients. The second remaining portion is allocated to one or more relatively lower-performance memory clients.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 5 is an exemplary table illustrating a memory channel address remapping based on various interleave bandwidth ratios.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
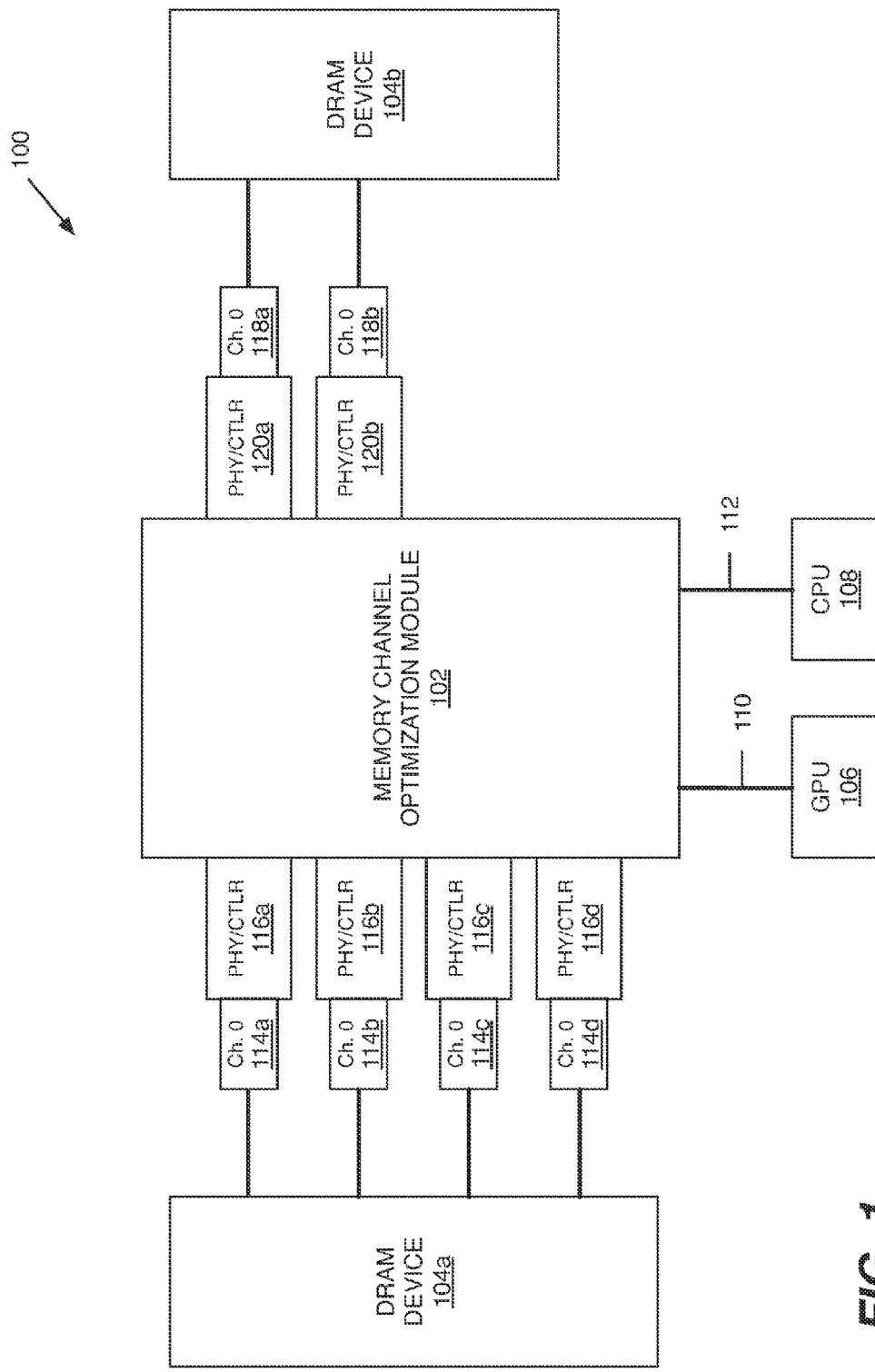
FIG. 1 is a block diagram of an embodiment of system for managing dissimilar memory devices.

FIG. 1 illustrates a system 100 comprising a memory management architecture that may be implemented in any suitable computing device having two or more dedicated processing units for accessing two or more memory devices of different types, or similar types of memory devices having different data bandwidths (referred to as "dissimilar memory devices"). The computing device may comprise a personal computer, a workstation, a server, a portable computing device (PCD), such as a cellular telephone, a portable digital assistant (PDA), a portable game console, a palmtop computers, or a tablet computer, and any other computing device with two or more dissimilar memory devices. As described below in more detail, the memory management architecture is configured to selectively provide two modes of operation: a unified mode and a discrete mode. In the discrete mode, the memory management architecture operates as a "discrete architecture" in the conventional manner as described above, in which each dedicated processing unit accesses a corresponding memory device optimized for its intended purpose. For example, a dedicated general purpose central processing unit (CPU) may access a first type of memory device at an optimized data bandwidth, and a higher-performance, dedicated graphics processing unit (GPU) may access a second type of memory device at a higher data bandwidth. In the unified mode, the memory management architecture is configured to unify the dissimilar memory devices and enable the dedicated processing units to selectively access, either individually or in combination, the combined bandwidth of the dissimilar memory devices or portions thereof.

As illustrated in the embodiment of FIG. 1, the system 100 comprises a memory channel optimization module 102 electrically connected to two different types of dynamic random access memory (DRAM) devices 104a and 104b and two or more dedicated processing units (e.g., a CPU 108 and a GPU 106) that may access the DRAM devices 104a and 104b. GPU 106 is coupled to the memory channel optimization module 102 via an electrical connection 110. CPU 108 is coupled to the memory channel optimization module 102 via an electrical connection 112. The memory channel optimization module 102 further comprises a plurality of hardware connections for coupling to DRAM devices 104a and 104b. The hardware connections may vary depending on the type of memory device. In the example of FIG. 1, DRAM 104a supports four channels 114a, 114b, 114c, and 114d that connect to physical/control connections 116a, 116b, 116c, and 116d, respectively. DRAM 104b supports two channels 118a and 118b that connect to physical/control connections 120a and 120b, respectively. It should be appreciated that the number and configuration of the physical/control connections may vary depending on the type of memory device, including the size of the memory addresses (e.g., 32-bit, 64-bit, etc.).

Figure 2:
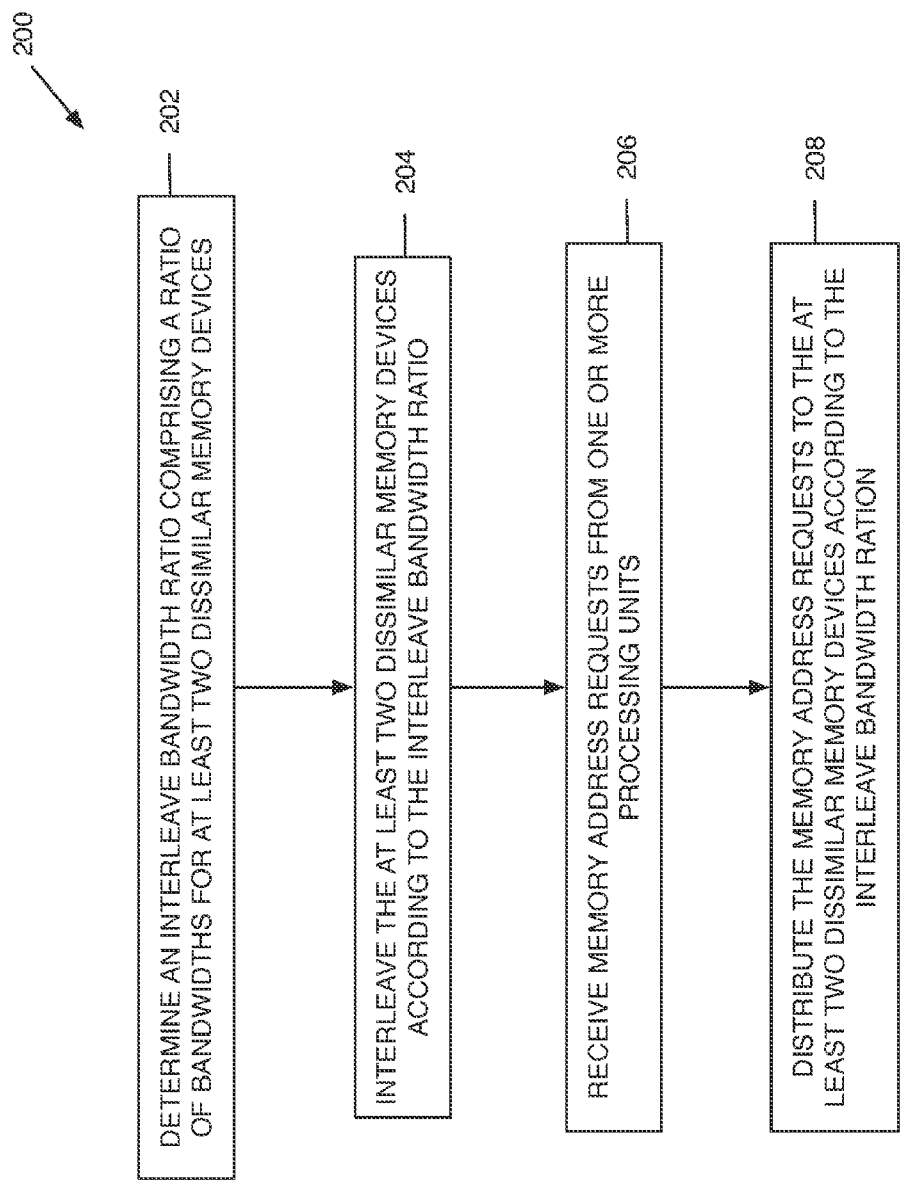
FIG. 2 is a flowchart of an embodiment of a method performed by the memory channel optimization module in FIG. 1 for managing dissimilar memory devices.

FIG. 2 illustrates a method 200 executed by the memory channel optimization module 102 for implementing the unified mode of operation by interleaving the dissimilar memory devices (e.g., DRAM devices 104a and 104b). At block 202, the memory channel optimization module 102 determines an interleave bandwidth ratio comprising a ratio of the data bandwidths for the DRAM devices 104a and 104b. The data bandwidths may be determined upon boot-up of the computing device.

Figure 3:
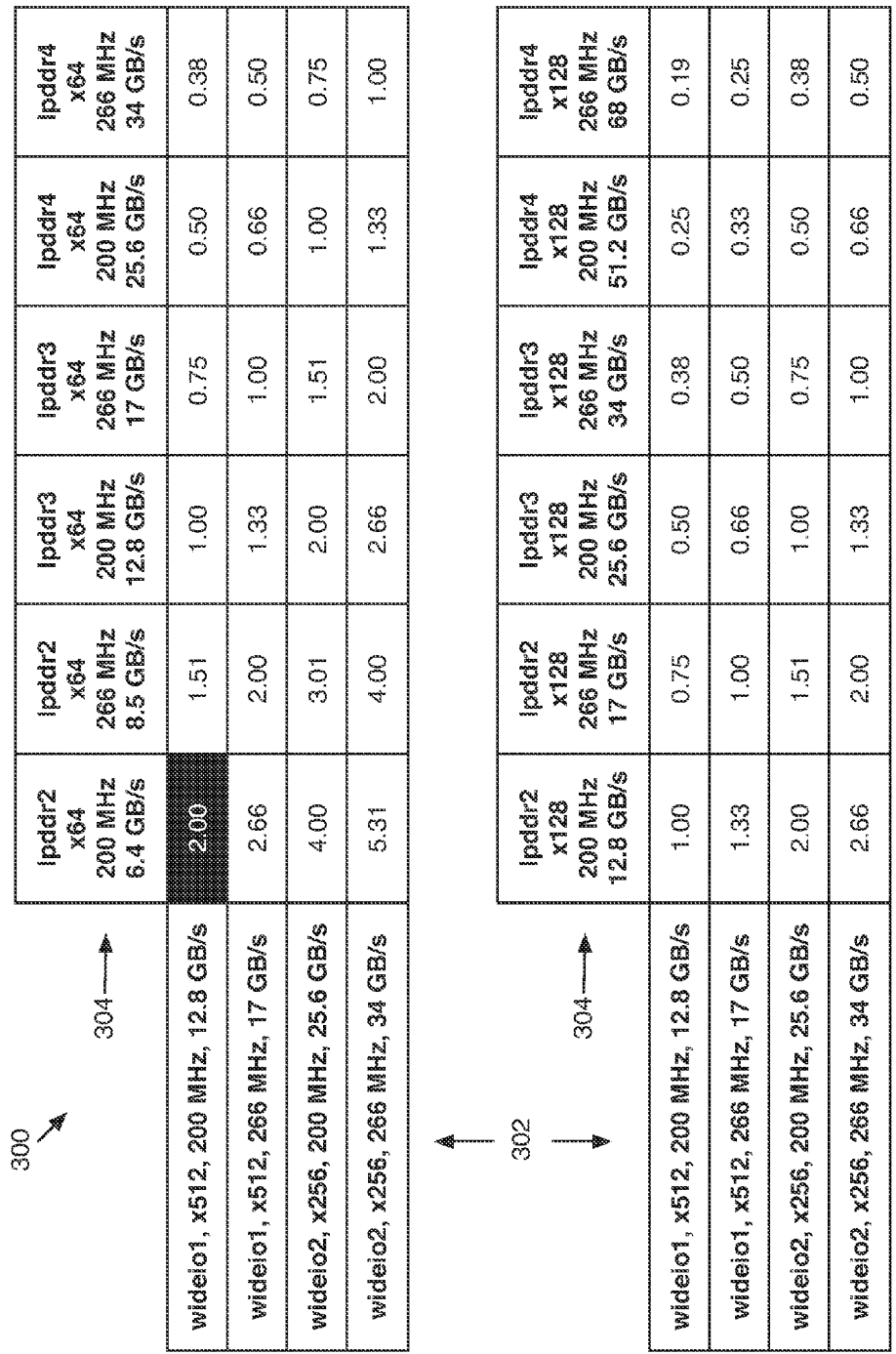
FIG. 3 is an exemplary table illustrating an interleave bandwidth ratio for various types of dissimilar memory devices.

In an embodiment, the interleave bandwidth ratio may be determined by accessing a data structure, such as, table 300 illustrated in FIG. 1. Table 300 identifies interleave bandwidth ratios for various combinations of types of dissimilar memory devices for implementing the two DRAM devices 104a and 104b. Columns 302 list various configurations for the DRAM device 104a. Rows 304 list various configurations for the DRAM device 104b. In this regard, each numerical data field identifies the interleave bandwidth ratio for the corresponding configuration row/column configuration. For example, the first data field in the upper portion of table 300 is highlighted in black and lists an interleave bandwidth ratio of 2.00, which corresponds to a bandwidth of 12.8 GB/s for the DRAM device 104a and a data bandwidth of 6.4 GB/s for the DRAM device 104b. In FIG. 3, the DRAM devices 104a and 104b are optimized for use in a mobile computing system. DRAM device 104b comprises a low power double data rate (LPDDR) memory device, which may be conventionally optimized for use in the discrete mode for dedicated use by the CPU 108. The DRAM device 104a comprises a Wide I/O (Wide IO) memory device, which may be conventionally optimized for use in the discrete mode for dedicated use by the GPU 106. In this regard, the numerical values identify the interleave bandwidth ratios for DRAM devices 104a and 104b according to variable performance parameters, such as, the memory address bit size (×64, ×128, ×256, ×512), clock speed (MHz), and data bandwidth (GB/s). The memory channel optimization module 102 may perform a look-up to obtain the interleave bandwidth ratio associated with the DRAM devices 104a and 104b. At block 202 in FIG. 2, the memory channel optimization module 102 may also determine the numerical data bandwidths (e.g., from a table 300 or directly from the DRAM devices 104a and 104b) and then use this data to calculate the interleave bandwidth ratio.

It should be appreciated that the types of memory devices and performance parameters may be varied depending on the particular type of computing device, system applications, etc. in which the system 100 is being implemented. The example types and performance parameters illustrated in FIG. 3 are merely used in this description to describe an exemplary interleaving method performed by the memory channel optimization module 102 in a mobile system. Some examples of other random access memory technologies suitable for the channel optimization module 102 include NOR FLASH, EEPROM, EPROM, DDR-NVM, PSRAM, SRAM, PROM, and ROM. One of ordinary skill in the art will readily appreciate that various alternative interleaving schemes and methods may be performed.

Referring again to FIG. 2, at block 204, the memory channel optimization module 102 interleaves the DRAM devices 104a and 104b according to the interleave bandwidth ratio determined in block 202. The interleaving process matches traffic to each of the memory channels 114a, 114b, 114c, 114d and 118a and 118b for DRAM devices 104a and 104b, respectively, to the particular channel's available bandwidth. For example, if the DRAM device 104a has a data bandwidth of 34 GB/s and the DRAM device 104b has a data bandwidth of 17 GB/s, the interleave bandwidth ratio is 2:1. This means that the data rate of the DRAM device 104a is twice as fast as the data rate of the DRAM device 104b.

Figure 4:
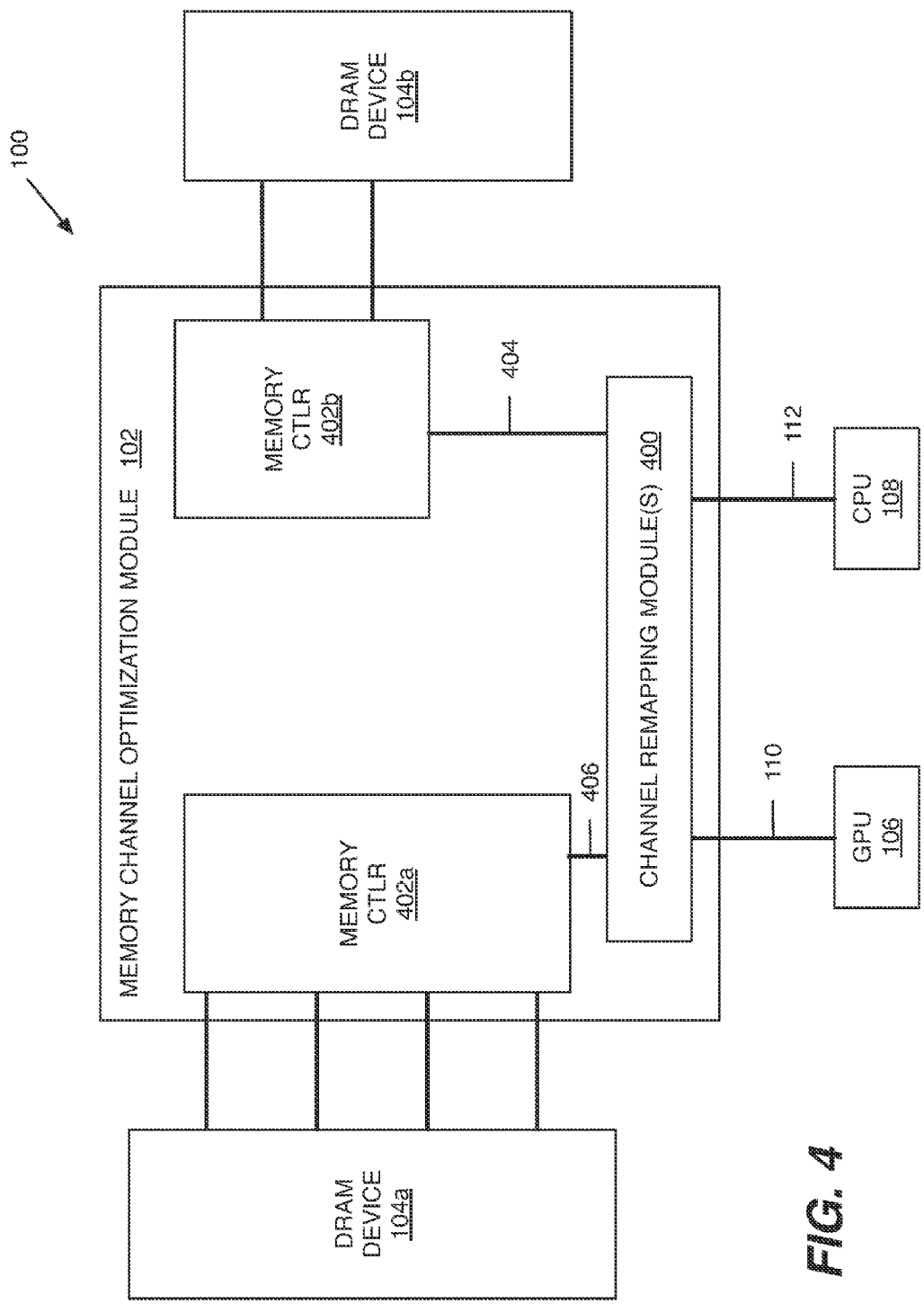
FIG. 4 is a block diagram illustrating components of the memory channel optimization module of FIG. 1.

As illustrated in FIG. 4, the memory channel optimization module 102 may comprise one or more channel remapping module(s) 400 for configuring and maintaining a virtual address mapping table for DRAM devices 104a and 104b according to the interleave bandwidth ratio and distributing traffic to the DRAM devices 104a and 104b according to the interleave bandwidth ratio. An exemplary address mapping table 500 is illustrated in FIG. 5. Address mapping table 500 comprises a list of address blocks 502 (which may be of any size) with corresponding channel and/or memory device assignments based on the interleave bandwidth ratio. For example, in FIG. 5, column 504 illustrates an alternating assignment between DRAM device 104a ("wideio2") and DRAM device 104b ("lpddr3e") based on an interleave bandwidth ratio of 1:1. Even numbered address blocks (N, N+2, N+4, N+6, etc.) are assigned to wideio2, and odd numbered address blocks (N+1, N+3, N+5, etc.) are assigned to lpddr3e.

Column 506 illustrates another assignment for an interleave bandwidth ratio of 2:1. Where DRAM device 104a ("wideio2") has a rate twice as fast as DRAM device 104b ("lpddr3e), two consecutive address blocks are assigned to wideio2 for every one address block assigned to lpddr3e. For example, address blocks N and N+1 are assigned to wideio2. Block N+2 is assigned to 1 ppdr3e. Blocks N+3 and N+4 are assigned to wideio2, and so on. Column 508 illustrates another assignment for an interleave bandwidth ration of 1:2 in which the assignment scheme is reversed because the DRAM device 104b ("lpddr3e") is twice as fast as DRAM device 104a ("wideio2").

Figure 6:
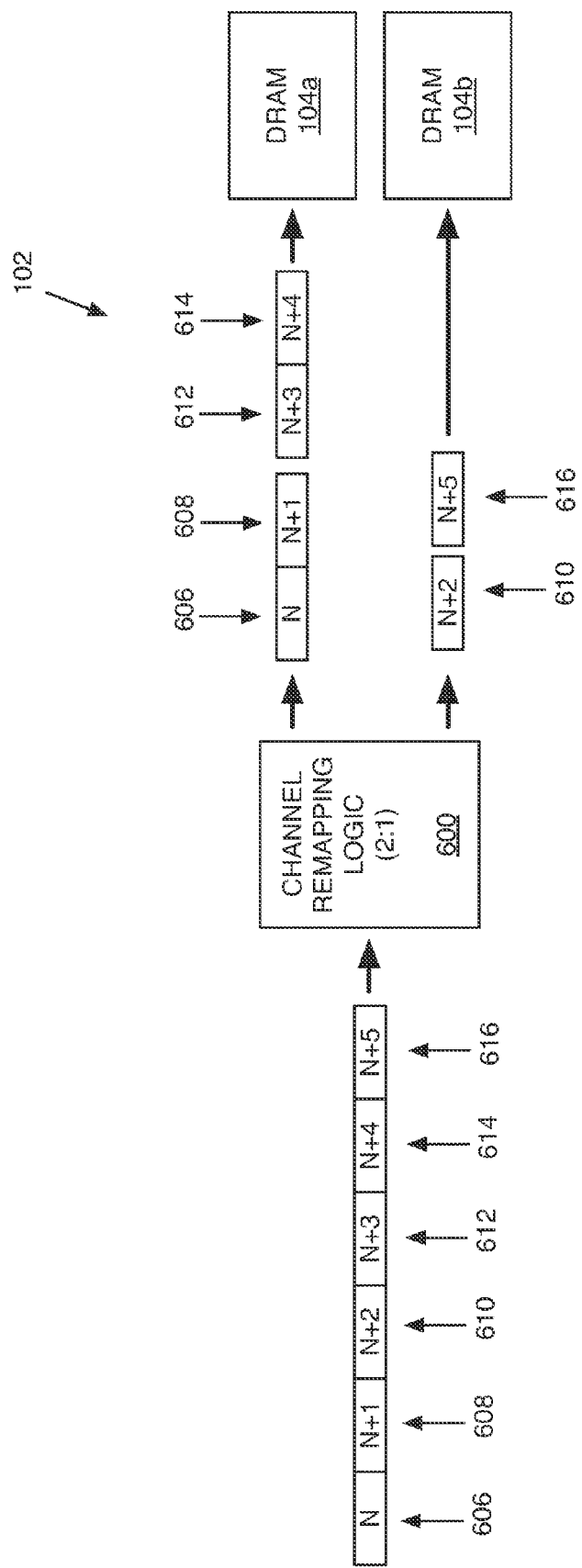
FIG. 6 is a combined flow/block diagram illustrating the general operation, architecture, and functionality of an embodiment of the channel remapping module of FIG. 4

Referring again to the flowchart of FIG. 2, at block 206, the GPU 106 and CPU 108 may access the interleaved memory, in a conventional manner, by sending memory address requests to the memory channel optimization module 102. As illustrated in FIG. 6, traffic may be received by channel remapping logic 600 as an input stream of requests 606, 608, 610, 612, 614, 616, etc. corresponding to address blocks N, N+1, N+2, N+3, N+4, N+5, etc. (FIG. 5). The channel remapping logic 600 is configured to distribute (block 208-FIG. 2) the traffic to the DRAM devices 104a and 104b according to the interleave bandwidth ratio and the appropriate assignment scheme contained in address mapping table 500 (e.g., columns 504, 506, 508, etc.).

Following the above example of a 2:1 interleave bandwidth ratio, the channel remapping logic 600 steers the requests 606, 608, 610, 612, 614, and 616 as illustrated in FIG. 6. Requests 606, 608, 612, and 614 for address blocks N, N+1, N+3, and N+4, respectively, may be steered to DRAM device 104a. Requests 610 and 616 for address blocks N+2, and N+5, respectively, may be steered to DRAM device 104b. In this manner, the incoming traffic from the GPU 106 and the CPU 108 may be optimally matched to the available bandwidth on any of the memory channels 114 for DRAM device 104a and/or the memory channels 118 for DRAM device 104b. This unified mode of operation enables the GPU 106 and the CPU 108 to individually and/or collectively access the combined bandwidth of the dissimilar memory devices rather than being limited to the "localized" high performance operation of the conventional discrete mode of operation.

Figure 7:
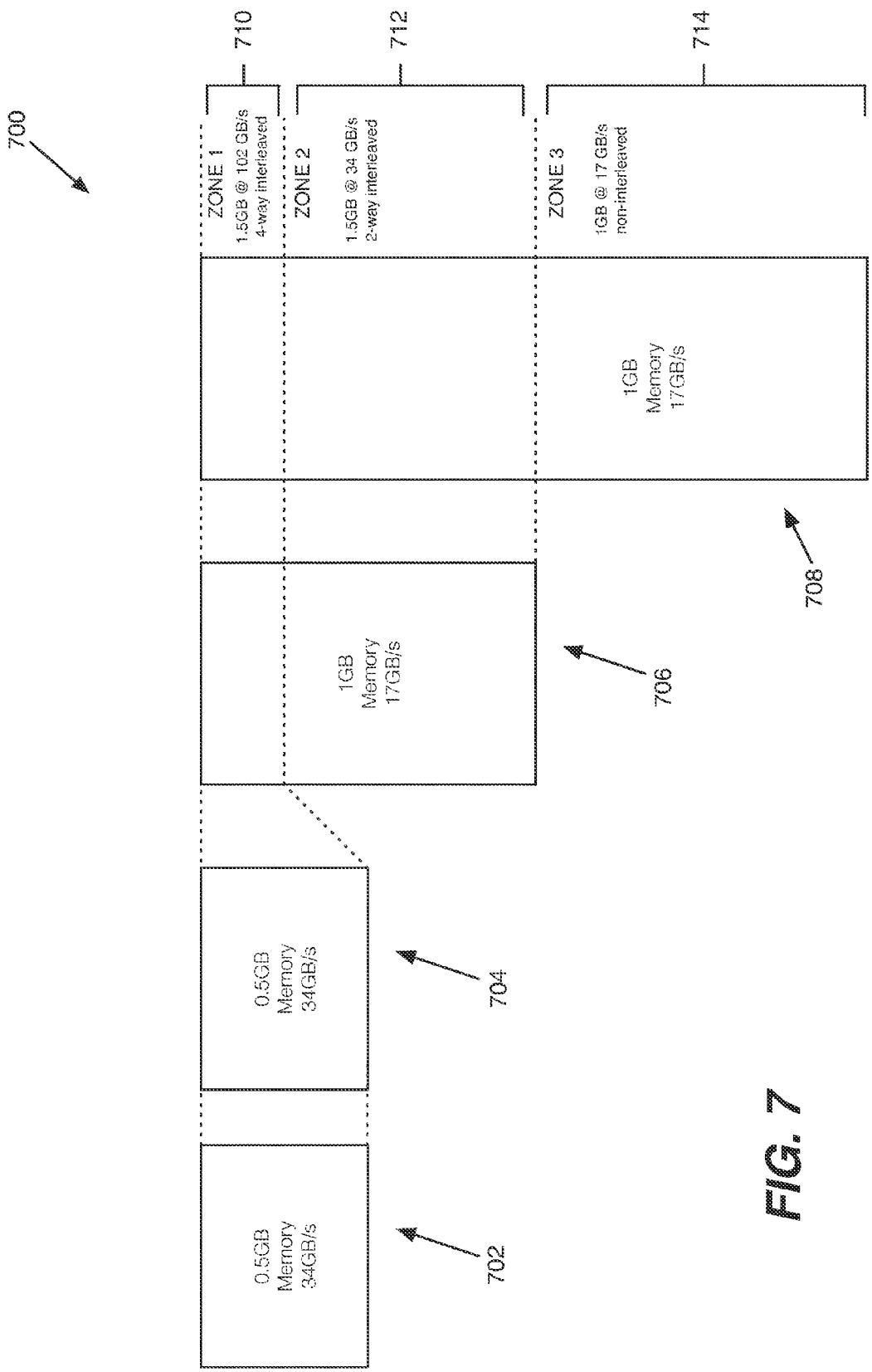
FIG. 7 is a diagram illustrating an embodiment of an interleave method for creating multiple logical zones across dissimilar memory devices.

As mentioned above, the memory channel optimization module 102 may be configured to selectively enable either the unified mode or the discrete mode based on various desirable use scenarios, system settings, etc. Furthermore, it should be appreciated that portions of the dissimilar memory devices may be interleaved rather than interleaving the entire memory devices. FIG. 7 illustrates a multi-layer interleave technique that may be implemented by memory channel optimization module 102 to create multiple "logical" devices or zones. Following the above example using a 2:1 interleave bandwidth ratio, the DRAM device 104a may comprise a pair of 0.5 GB memory devices 702 and 704 having a high performance bandwidth of 34 GB/s conventionally optimized for GPU 106. DRAM device 104b may comprise a 1 GB memory device 706 and a 2 GB memory device 708 each having a lower bandwidth of 17 GB/s conventionally optimized for CPU 108. The multi-layer interleave technique may create two interleaved zones 710 and 712 and a non-interleaved zone 714. Zone 710 may be 4-way interleaved to provide a combined 1.5 GB at a combined bandwidth of 102 GB/s. Zone 712 may be 2-way interleaved to provide a combined 1.5 GB at 34 GB/s/Zone 714 may be non-interleaved to provide 1 GB at 17 GB/s. The multi-layer interleaving technique combined with the memory management architecture of system 100 may facilitate transitioning between interleaved and non-interleaved portions because the contents of interleaved zones 710 and 712 may be explicitly designated for evictable or migratable data structures and buffers, whereas the contents of non-interleaved zone 714 may be designated for processing, such as, kernel operations and/or other low memory processes.

Figure 8:
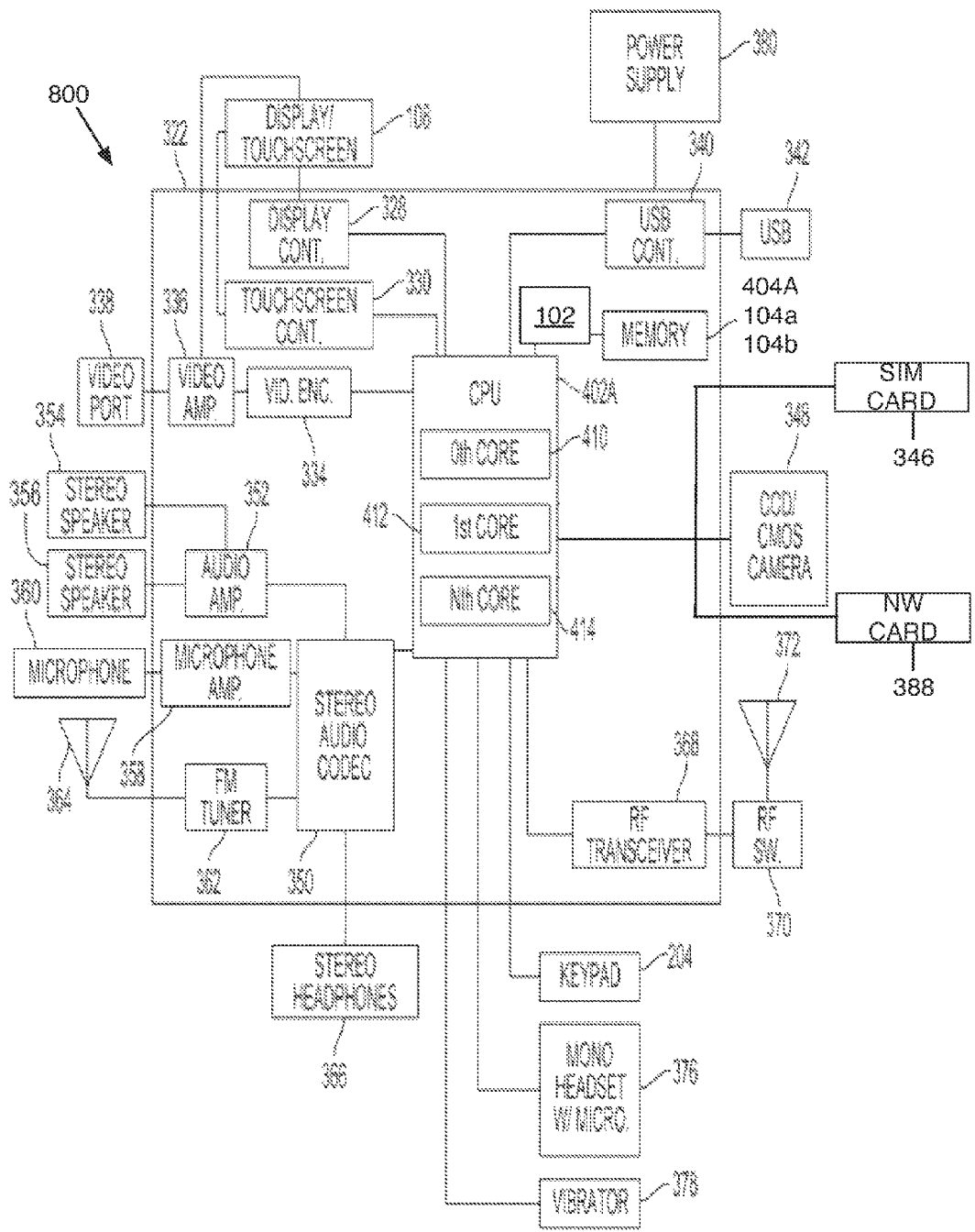
FIG. 8 is a block diagram illustrating an exemplary implementation of the memory channel optimization module in a portable computing device.

As mentioned above, the memory channel optimization module 102 may be incorporated into any desirable computing system. FIG. 8 illustrates the memory channel optimization module 102 incorporated in an exemplary portable computing device (PCD) 800. The memory optimization module 102 may comprise a system-on-a-chip (SoC) or an embedded system that may be separately manufactured and incorporated into designs for the portable computing device 800.

As shown, the PCD 800 includes an on-chip system 322 that includes a multicore CPU 402A. The multicore CPU 402A may include a zeroth core 410, a first core 412, and an Nth core 414. One of the cores may comprise, for example, the GPU 106 with one or more of the others comprising CPU 108. According to alternate exemplary embodiments, the CPU 402 may also comprise those of single core types and not one which has multiple cores, in which case the CPU 108 and the GPU 106 may be dedicated processors, as illustrated in system 100.

A display controller 328 and a touch screen controller 330 may be coupled to the GPU 106. In turn, the touch screen display 108 external to the on-chip system 322 may be coupled to the display controller 328 and the touch screen controller 330.

FIG. 8 further shows that a video encoder 334, e.g., a phase alternating line (PAL) encoder, a sequential color a memoire (SECAM) encoder, or a national television system(s) committee (NTSC) encoder, is coupled to the multicore CPU 402A. Further, a video amplifier 336 is coupled to the video encoder 334 and the touch screen display 108. Also, a video port 338 is coupled to the video amplifier 336. As shown in FIG. 8, a universal serial bus (USB) controller 340 is coupled to the multicore CPU 402A. Also, a USB port 342 is coupled to the USB controller 340. Memory 404A and a subscriber identity module (SIM) card 346 may also be coupled to the multicore CPU 402A. Memory 404A may comprise two or more dissimilar memory devices (e.g., DRAM devices 104a and 104b), as described above. The memory channel optimization module 102 may be coupled to the CPU 402A (including, for example, a CPU 108 and GPU 106) and the memory 404A may comprise two or more dissimilar memory devices. The memory channel optimization module 102 may be incorporated as a separate system-on-a-chip (SoC) or as a component of SoC 322.

Further, as shown in FIG. 8, a digital camera 348 may be coupled to the multicore CPU 402A. In an exemplary aspect, the digital camera 348 is a charge-coupled device (CCD) camera or a complementary metal-oxide semiconductor (CMOS) camera.

As further illustrated in FIG. 8, a stereo audio coder-decoder (CODEC) 350 may be coupled to the multicore CPU 402A. Moreover, an audio amplifier 352 may be coupled to the stereo audio CODEC 350. In an exemplary aspect, a first stereo speaker 354 and a second stereo speaker 356 are coupled to the audio amplifier 352. FIG. 8 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 8 further illustrates that a radio frequency (RF) transceiver 368 may be coupled to the multicore CPU 402A. An RF switch 370 may be coupled to the RF transceiver 368 and an RF antenna 372. As shown in FIG. 8, a keypad 204 may be coupled to the multicore CPU 402A. Also, a mono headset with a microphone 376 may be coupled to the multicore CPU 402A. Further, a vibrator device 378 may be coupled to the multicore CPU 402A.

FIG. 8 also shows that a power supply 380 may be coupled to the on-chip system 322. In a particular aspect, the power supply 380 is a direct current (DC) power supply that provides power to the various components of the PCD 800 that require power. Further, in a particular aspect, the power supply is a rechargeable DC battery or a DC power supply that is derived from an alternating current (AC) to DC transformer that is connected to an AC power source.

FIG. 8 further indicates that the PCD 800 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 8, the touch screen display 108, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

Figure 9:
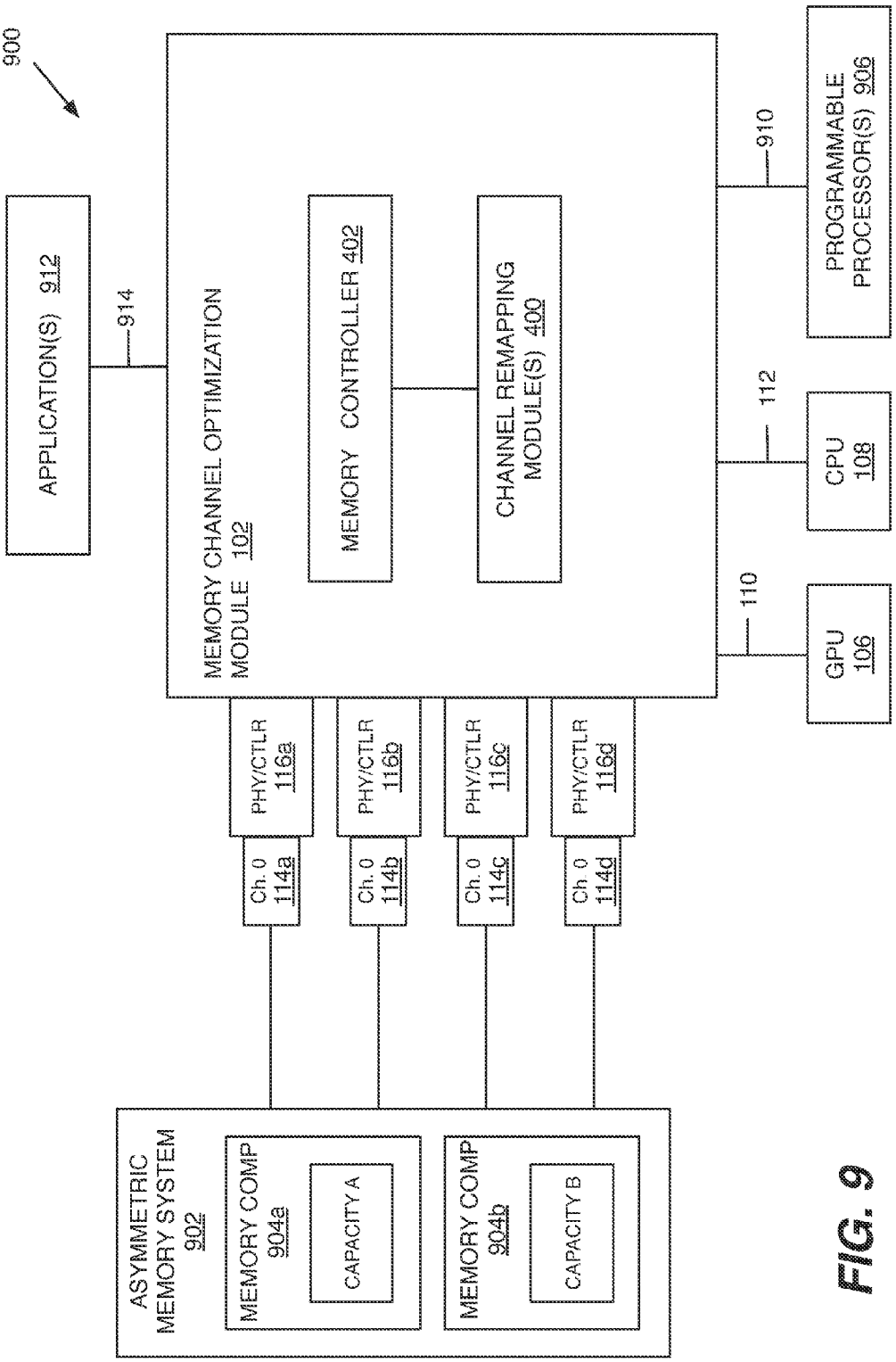
FIG. 9 is a block diagram illustrating another embodiment of system comprising the memory channel optimization module coupled to a unitary memory subsystem having memory components with asymmetric memory capacities.

FIG. 9 illustrates another embodiment of a system 900 for generally implementing the channel remapping solutions described above to dynamically allocate memory in a memory subsystem. The memory subsystem may comprise an asymmetric memory subsystem 902 comprising a unitary memory device having two or more embedded memory components (e.g., memory components 904a and 904b) with asymmetric memory capacities (e.g., capacity A and capacity B, respectively). One of ordinary skill in the art will appreciate that asymmetric memory capacities, or asymmetric component sizing, refers to the situation in which the memory capacity connected to one channel differs from the memory capacity connected to the second channel. For example, in an asymmetric memory subsystem 902, memory component 904a may have a 1 GB capacity component and memory component 904b may have a 2 GB component.

Asymmetric component sizing in a memory subsystem may be arise in various situations. Original equipment manufacturers (OEMs) or other related providers of either hardware and/or software may dictate the usage of asymmetric component sizing to achieve, for instance, cost targets, performance/cost tradeoffs, etc. While asymmetric component sizing may provide certain cost or other advantages, it comes at the expense of the memory performance. As known in the art and described above, operational memory performance may be improved through the use of interleaved memory.

However, in conventional memory systems configured with asymmetric component sizing, system memory organization may be required to either be configured as non-interleaved memory without any performance improvements or partially interleaved to achieve some performance improvements.

In existing solutions that employ partially-interleaved memory configurations, there is a need to direct fully-interleaved memory allocations for memory bandwidth sensitive usages. This problem requires more complicated and expensive software solutions. For example, direct allocations may require a secondary memory allocator or a memory pool allocator. Additional complexity and expense may arise to support different technical platforms and/or operating systems. Because of these complexities, existing systems may avoid interleaving in asymmetric component configurations, instead using a traditional single memory allocator. As a result, applications that may require or would benefit from interleaved memory suffer performance degradation.

Another approach to address these problems has been to employ two memory allocators. One memory allocator is configured to allocate memory to a high-performance interleaved pool and another memory allocator that allocates to a relatively lower-performance non-interleaved pool. There are many disadvantages to such approaches.

For example, performance applications must be aware of the high-performance memory allocator to allocate from the fully-interleaved pool. The other applications must allocate through a standard memory allocator, such as, for example, a memory allocation function (i.e., malloc( ) as known in the art. The implementation of the memory allocation function has only one of two ways to gather and distribute memory. It either pulls from the non-interleaved pool, which is wasteful as described above, or it pulls from the relatively lower-performance, non-interleaved pool and from the interleaved pool using algorithms to determine which pool to pull from. This situation provides inconsistent performance for applications using the standard memory allocator. The process of determining from which pool the application using the standard memory allocator will receive memory is non-deterministic. To address this problem the memory allocator may provide a customized interface. A customized solution may be configured to, for example, track and maintain a history of what performance pool each allocation was made from, for each allocation made by every application, and then store that data across power cycles. However, customized solutions, such as these, are complicated and expensive.

Furthermore, only applications that have been specially-configured to use the alternate allocator may use the high-performance pool. Because the higher-performance memory pool is always the largest memory pool due to the nature of the physical memory configurations, this is a very wasteful approach. Optimizations can be made to reduce the waste, such as locating the processor images into the high-performance memory, or other hand tuned optimizations, but ultimately the majority of the dynamically allocable memory is not available for its intended shared usage. In a modification of this approach, some existing systems introduce the notion of "carveouts" in which high-performance memory is pre-allocated to known applications with high-performance requirements. Nonetheless, all known existing solutions suffer from either memory allocation inefficiencies or inconsistent performance to the memory users who do not directly and specifically allocate from the high-performance pool.

It should be appreciated that system 900 illustrated in FIG. 9 may provide a unique solution that addresses one or more of the above-described problems for optimizing memory performance in an asymmetric memory system 902 having memory components 904*a* and 904*b* with asymmetric capacities. For example, the system 900 may be implemented with a standard memory allocation while still providing uniform performance memory to memory pools with different performance levels. As described below in more detail, in other embodiments, system 900 may be configured to adjust the performance associated with two or more memory pools by, for example, remapping an interleave bandwidth ratio in the event that more or less of an interleaved memory pool becomes available to the standard allocator.

In general, the system 900 incorporates the memory channel optimization module 102 and leverages the channel remapping approach described above with reference to FIGS. 1-8 to dynamically allocate memory to two or more memory regions or partitions. As illustrated in the embodiment of FIG. 9, the system 900 comprises the memory channel optimization module 102 electrically connected to the asymmetric memory system 902 and any number of processing units that may access the asymmetric memory system 902. It should be appreciated that the processing units may include dedicated processing units (e.g., a CPU 108 and a GPU 106) or other programmable processors 906. GPU 106 is coupled to the memory channel optimization module 102 via an electrical connection 110. CPU 108 is coupled to the memory channel optimization module 102 via an electrical connection 112. The programmable processors 906 are coupled to the memory channel optimization module 102 via connection(s) 910. The dedicated processing units, the programmable processor 906, and the applications 912 may be generally referred to a "clients" of the asymmetric memory system 902 and/or the memory channel optimization module 102.

The programmable processors 906 may comprise digital signal processor(s) (DSPs) for special-purpose and/or general-purpose applications including, for example, video applications, audio applications, or any other applications 912. The dedicated processing units and/or programmable processors 906 may support heterogeneous computing platforms configured to support a heterogeneous system architecture (HSA), such as those disclosed in HSA standards published by the HSA Foundation. The current standard, AMD I/O Virtualization Technology (IOMMU) Specification (Publication No. 48882, Revision 2.00, issued Mar. 24, 2011), is hereby incorporated by reference in its entirety.

As known in the art, HSA creates an improved processor design that exposes to the applications 912 the benefits and capabilities of mainstream programmable computing elements. With HSA, the applications 912 can create data structures in a single unified address space and can initiate work items in parallel on the hardware most appropriate for a given task. Sharing data between computing elements is as simple as sending a pointer. Multiple computing tasks can work on the same coherent memory regions, utilizing barriers and atomic memory operations as needed to maintain data synchronization.

As described below in more detail, in an embodiment, the system 900 may provide an advantageous memory system configuration in a HSA context by dynamically allocating memory for the clients to two or more memory regions (e.g., high-performance region 1001 and a low-performance region 1003-FIG. 10).

Referring again to FIG. 9, the memory channel optimization module 102 further comprises a plurality of hardware connections for coupling to the asymmetric memory system 902. The hardware connections may vary depending on the type of memory devices. In an embodiment, the memory devices comprise a double data rate (DDR) memory device having asymmetric component sizing, although other types and configurations may be suitable. In the example of FIG. 9, the asymmetric memory system 902 supports four channels 114a, 114b, 114c, and 114d that connect to physical/control connections 116a, 116b, 116c, and 116d, respectively. Channels 114a and 114b may be associated with the memory component 904a and the channels 114c and 114d may be associated with the memory component 904b. It should be appreciated that the number and configuration of the physical/control connections may vary depending on the type of memory device, including the size of the memory addresses (e.g., 32-bit, 64-bit, etc.).

The memory channel optimization module 102 in system 900 may comprise one or more channel remapping module(s) 400 for configuring and maintaining a virtual address mapping table and an associated memory controller 402 for dynamically allocating memory into two or more memory regions.

Figure 10:
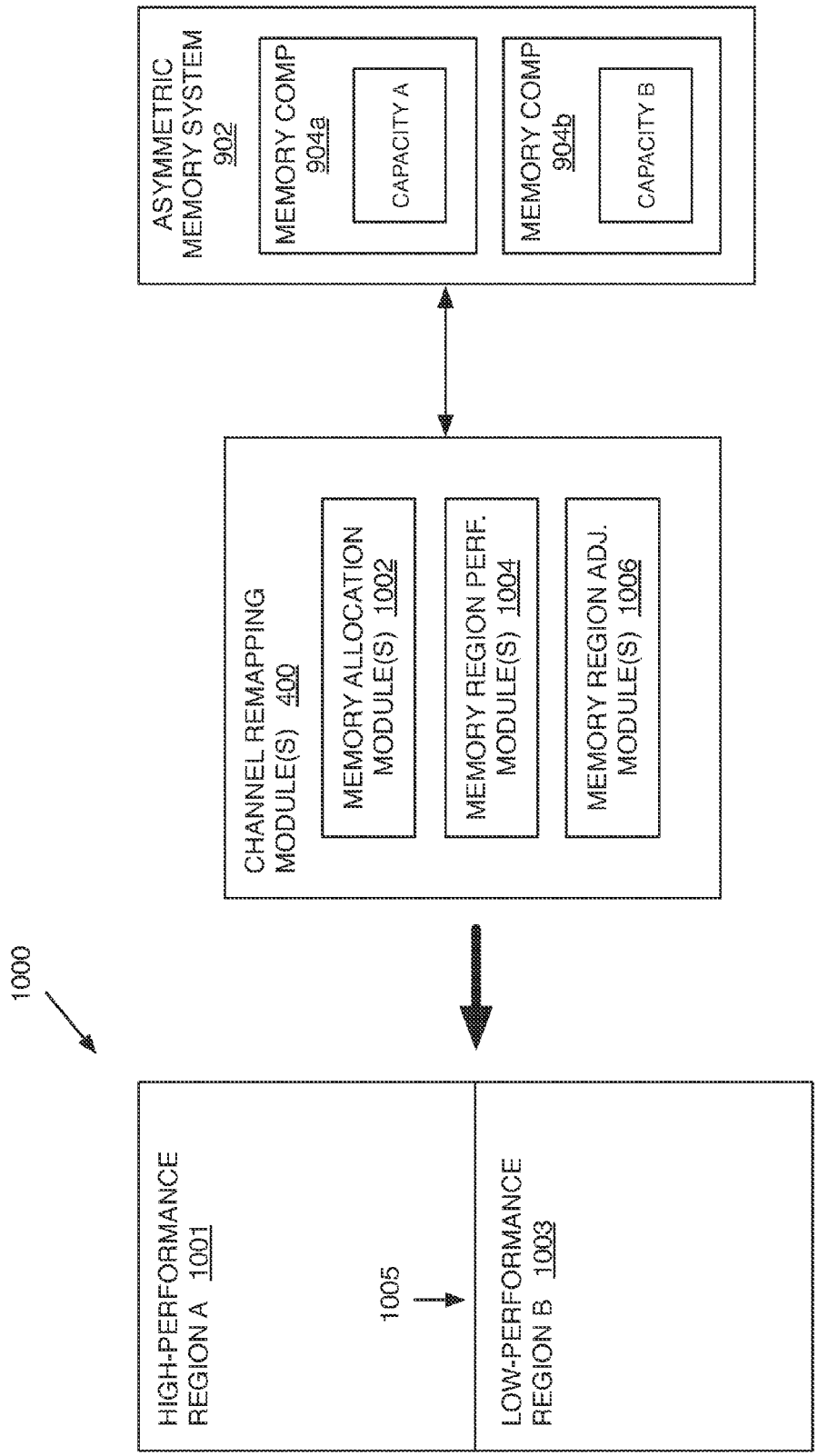
FIG. 10 is block diagram illustrating an embodiment of the channel remapping module(s) of FIG. 9 for dynamically allocating memory in the unitary memory subsystem into a high-performance region and a low-performance region.

As illustrated in the embodiment of FIG. 10, the memory regions may comprise a first high-performance memory region 1001 and a second relatively lower-performance memory region 1003. The high-performance memory region 1001 may comprise a fully-interleaved portion of the asymmetric memory system 902. The channel remapping module(s) 400 may allocate the high-performance memory region 1001 to applications 912 or other clients. In this regard, one or more of the applications 912, GPU 106, CPU 108, and programmable processors 906 may be configured to utilize a custom application program interface (API), which allocates from the high-performance memory region 1001. The high-performance memory region 1001 may be sized specifically for the expected high performance memory utilization requirements of the respective clients. The remaining portion of the memory in asymmetric memory system 902 may comprise the low performance region 1003. Reference numeral 1005 represents a memory boundary in the address range between the high-performance memory region 1001 and the low-performance memory region 1003.

In the embodiment of FIG. 10, a memory allocation module 1002 configures and boots the address ranges of the high-performance memory region 1001 and the low-performance memory region 1003. The high-performance memory region 1001 may be fully interleaved to provide optimal performance to relatively higher bandwidth clients. The low-performance memory region 1003 may be memory bandwidth interleaved with, for example, an optimal interleave bandwidth ratio according to the relative portion of interleaved and non-interleaved memory blocks in the asymmetric memory system 902. The interleave bandwidth ratio may be determined, and memory dynamically allocated, in the manner described above with respect to FIGS. 1-8 or otherwise. One of ordinary skill in the art will appreciate that this approach may enable the memory channel optimization module 102 to make more optimal use of the available system memory, as more memory is available for the standard client of the memory the channel remapping module(s) 400 may ensure consistent performance in the allocated memory.

The size of the high-performance memory region 1001 and the low-performance memory region 1003 may remain fixed during operation of the system 900. In other embodiments, the memory boundary 1005 may be dynamically adjusted during operation of the system 900. For instance, when all of the memory addresses in one of the memory regions 1001 or 1003 have been allocated (or approach a predetermined threshold) and the other region has available addresses, a memory region adjustment module 1006 may adjust the memory boundary 1005 to increase the size of the depleted memory region. The memory region adjustment module 1006 may determine the need to revise the memory regions 1001 and 1003 using, for example, conventional threshold techniques or threshold and/or threshold techniques with hysteresis. In another embodiment, a memory region performance module 1004 may be configured to monitor the performance of the high-performance memory region 1001 and/or the low-performance memory region 1003. Based on the monitored performance, the memory region adjustment module 1006 may be configured to determine the need for adjustment.

After determining the need to adjust the memory boundary 1005, the channel remapping module 400 may be configured with the revised region boundary. The revised memory boundary may be configured, for example, at the system design level. In other embodiments, the memory boundary 1005 may be adjusted by determining a revised interleave bandwidth ratio to ensure a performance level across one or both of the memory regions 1001 and 1003. For instance, the performance of the system 900 may be improved or degraded depending on whether the low-performance memory region 1003 is growing or shrinking. As known in the art, the performance of the low-performance memory region 1003 generally increases as the size of the region grows because it will comprise a larger portion of fully-interleaved memory.

Figure 11:
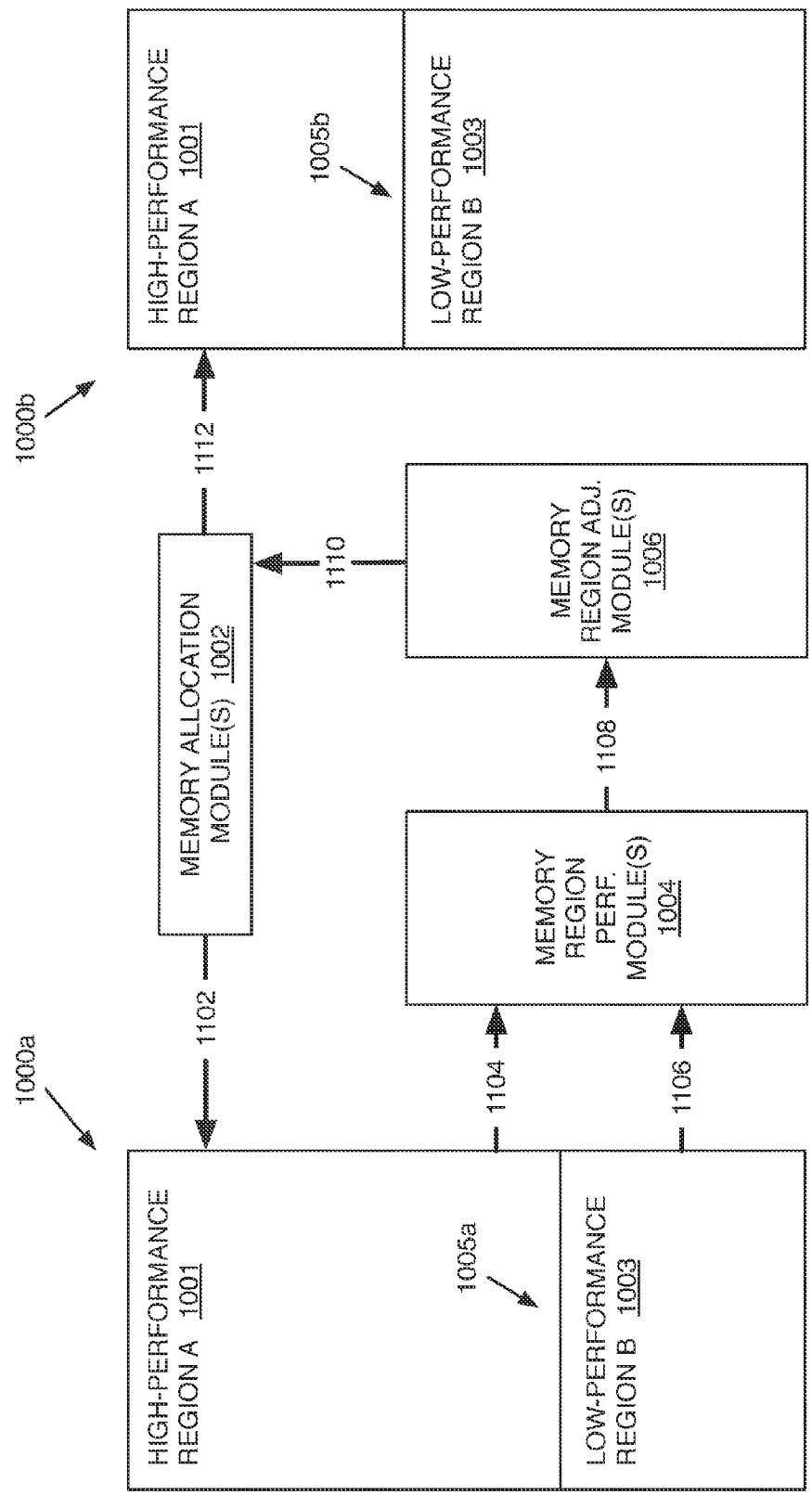
FIG. 11 is a combined block/flow diagram illustrating the architecture, operation, and/or functionality of the channel remapping module(s) for configuring and adjusting the high-performance region and the low-performance region.

FIG. 11 illustrates an embodiment of the channel remapping module(s) 400 for adjusting, during operation of the system 900, the high-performance memory region 1001 and the low-performance memory region 1003. At step 1102, the memory allocation module 1002 initially configures the high-performance memory region 1001 and the low-performance memory region 1003 in a first state 1000a with a corresponding memory boundary region 1005a. In this example, the high-performance memory region 1001 comprises a larger portion than the low-performance memory region 1003. During operation of the system 900, the memory region performance module 1004 monitors the performance of both memory regions (steps 1104 and 1106). If there is a need to adjust the memory boundary 1005a based on the monitored performance (step 1108), the memory region adjustment module 1006 may trigger, at step 1110, a revised memory boundary 1005b. The revised memory boundary 1005b corresponds to a second state 1000b in which the size of the high-performance memory region 1001 is decreased and the size of the low-performance memory region 1003 is increased. It should be appreciated that the size of either memory region 1001 or 1003 may be increased or decreased to accommodate various desired performance situations.

Figure 12:
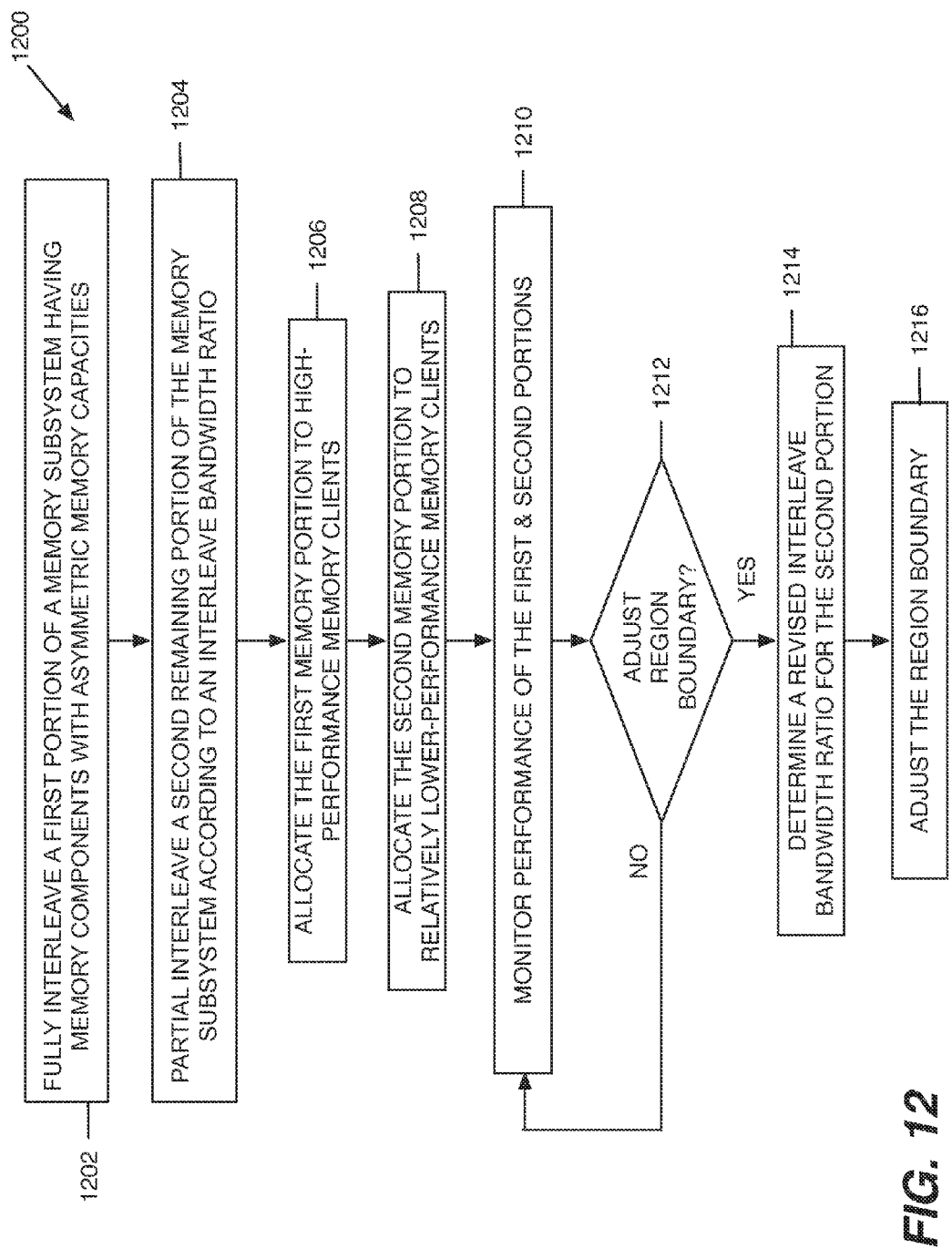
FIG. 12 is a flowchart illustrating an embodiment of a method for dynamically allocating memory in the system of FIG. 9.

FIG. 12 illustrates an embodiment of a method for dynamically allocating memory in system 900. At block 1202, a first portion of the memory subsystem is fully interleaved. At block 1204, a second remaining portion of the memory subsystem is partially interleaved according to an interleave bandwidth ratio. At block 1206, the first portion is allocated to high-performance memory clients. At block 1208, the second portion is allocated to relatively lower-performance memory clients. The interleaving and/or memory allocation may be performed by the memory channel optimization module 102, the channel remapping module(s) 400, and/or the memory allocation module(s) 1002 (FIGS. 1, 4, 9, 10 and 11) in the manner described above. At block 1210, the performance of the first and/or second portions may be monitored according to predefined performance thresholds, operational conditions, or available memory addresses by, for example, the memory region performance module(s) 1004 (FIGS. 10 and 11). At decision block 1212, the memory region adjustment module(s) 1006 (FIGS. 10 and 11) determines whether the memory region boundary is to be adjusted. If no adjustment is need, flow returns to block 1210. If it is determined that the memory region boundary is to be adjusted, at block 1214, the channel remapping module(s) and/or the memory channel optimization module 102 determines a revised interleave bandwidth ratio for the second portion. At block 1216, the memory region boundary is adjusted, according to the revised bandwidth ratio, via one or more of the memory channel optimization module 102, the channel remapping module(s) 400, and/or the memory allocation module(s) 1002.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for dynamically allocating a memory subsystem, the method comprising:
fully interleaving a first portion of a memory subsystem having memory components with asymmetric memory capacities;
partial interleaving a second remaining portion of the memory subsystem according to an interleave bandwidth ratio, the interleave bandwidth ratio comprising a ratio of data bandwidths for the first portion and the second portion of the memory subsystem;
allocating the first portion of the memory subsystem to one or more high-performance memory clients;
allocating the second remaining portion of the memory subsystem to one or more relatively lower-performance memory clients;
monitoring performance of the first and second portions of the memory subsystem; and
in response to the monitored performance, adjusting a relative memory allocation between the first and second portions of the memory subsystem, wherein adjusting the relative memory allocation between the first and second portions of the memory subsystem comprises determining a revised interleave bandwidth ratio based on the monitored performance.

2. The method of claim 1, wherein the memory clients comprise one or more of an application, a central processing unit, a graphics processing unit, and a programmable processor.

3. The method of claim 1, wherein the interleave bandwidth ratio comprises a ratio of bandwidths for an interleaved memory block and a non-interleaved memory block.

4. The method of claim 1, wherein the memory subsystem comprises a double data rate (DDR) memory device.

5. The method of claim 1, wherein the one or more high-performance memory clients support a heterogeneous system architecture.

6. The method of claim 1, wherein a memory channel optimization module allocates the memory, and the memory clients are coupled to the memory channel optimization module.

7. A system for dynamically allocating a memory subsystem, the method comprising:
means for fully interleaving a first portion of a memory subsystem having memory components with asymmetric memory capacities;
means for partial interleaving a second remaining portion of the memory subsystem according to an interleave bandwidth ratio, the interleave bandwidth ratio comprising a ratio of data bandwidths for the first portion and the second portion of the memory subsystem;
means for allocating the first portion of the memory subsystem to one or more high-performance memory clients;
means for allocating the second remaining portion of the memory subsystem to one or more relatively lower-performance memory clients;

means for monitoring performance of the first and second portions of the memory subsystem; and means for adjusting, in response to the monitored performance, a relative memory allocation between the first and second portions of the memory subsystem, wherein adjusting the relative memory allocation between the first and second portions of the memory subsystem comprises determining a revised interleave bandwidth ratio based on the monitored performance.

8. The system of claim 7, wherein the memory clients comprise one or more of an application, a central processing unit, a graphics processing unit, and a programmable processor.

9. The system of claim 7, wherein the interleave bandwidth ratio comprises a ratio of bandwidths for an interleaved memory block and a non-interleaved memory block.

10. The system of claim 7, wherein the memory subsystem comprises a double data rate (DDR) memory device.

11. The system of claim 7, wherein the one or more high-performance memory clients support a heterogeneous system architecture.

12. A memory system for dynamically allocating memory in a portable computing device, the memory system comprising:

a memory subsystem having memory components with asymmetric memory capacities; and a memory channel optimization module electrically coupled to the memory subsystem for providing a plurality of channels via respective electrical connections, the memory channel optimization module comprising logic configured to:

fully interleave a first portion of the memory subsystem having the memory components with asymmetric memory capacities;

partial interleave a second remaining portion of the memory subsystem according to an interleave bandwidth ratio, the interleave bandwidth ratio comprising a ratio of data bandwidths for the first portion and the second portion of the memory subsystem;

allocate the first portion of the memory subsystem to one or more high-performance memory clients;

allocate the second remaining portion of the memory subsystem to one or more relatively lower-performance memory clients;

monitoring performance of the first and second portions of the memory subsystem; and in response to the monitored performance, adjusting a relative memory allocation between the first and second portions of the memory subsystem, wherein adjusting the relative memory allocation between the first and second portions of the memory subsystem comprises determining a revised interleave bandwidth ratio based on the monitored performance.

13. The memory system of claim 12, wherein the memory clients comprise one or more of an application, a central processing unit, a graphics processing unit, and a programmable processor.

14. The memory system of claim 12, wherein the interleave bandwidth ratio comprises a ratio of bandwidths for an interleaved memory block and a non-interleaved memory block.

15. The memory system of claim 12, wherein the memory subsystem comprises a double data rate (DDR) memory device.

16. The memory system of claim 12, wherein the one or more high-performance memory clients support a heterogeneous system architecture.

17. A computer program product comprising a non-transitory computer usable medium having a computer readable program code embodied therein, the computer readable program code adapted to be executed to implement a method for dynamically allocating memory in a portable computer device, the method comprising:

fully interleaving a first portion of a memory subsystem having memory components with asymmetric memory capacities;

partial interleaving a second remaining portion of the memory subsystem according to an interleave bandwidth ratio, the interleave bandwidth ratio comprising a ratio of data bandwidths for the first portion and the second portion of the memory subsystem;

allocating the first portion of the memory subsystem to one or more high-performance memory clients;

allocating the second remaining portion of the memory subsystem to one or more relatively lower-performance memory clients;

monitoring performance of the first and second portions of the memory subsystem; and in response to the monitored performance, adjusting a relative memory allocation between the first and second portions of the memory subsystem, wherein adjusting the relative memory allocation between the first and second portions of the memory subsystem comprises determining a revised interleave bandwidth ratio based on the monitored performance.

18. The computer program product of claim 17, wherein the memory clients comprise one or more of an application, a central processing unit, a graphics processing unit, and a programmable processor.

19. The computer program of claim 17, wherein the interleave bandwidth ratio comprises a ratio of bandwidths for an interleaved memory block and a non-interleaved memory block.

20. The computer program of claim 17, wherein the memory subsystem comprises a double data rate (DDR) memory device.

21. The computer program of claim 17, wherein the one or more high-performance memory clients support a heterogeneous system architecture.

\* \* \* \* \*